Sheet 1.
3 Sheets.

Powers & Smith
Mower.

No 1626

Reissued Feb. 23, 1864

Witnesses.
Richardson Gawley
James Laird

Inventors.
John Powers
E. M. Smith

Sheet 2.
3 Sheets.

Powers & Smith.
Mower.

№ 1626 Reissued Feb. 23, 1864

Witnesses.
Richardson Gawley
James Laird

Inventors.
John Powers
E. M. Smith

Sheet 3.
3 Sheets.

Powers & Smith.
Mower.

No. 1626 Reissued Feb. 23, 1864

Witnesses.
Richardson Gawley
James Laird

Inventors.
John Powers
E. M. Smith

UNITED STATES PATENT OFFICE.

MITCHELL, VANCE & CO., OF NEW YORK, N. Y., ASSIGNEES, BY MESNE ASSIGNMENTS, OF JNO. POWERS AND E. M. SMITH.

IMPROVEMENT IN HARVESTERS.

Specification forming part of Letters Patent No. 34,186, dated January 14, 1862; Reissue No. 1,626, dated February 23, 1864.

*To all whom it may concern:*

Be it known that JOHN POWERS and EDGAR M. SMITH, of the city, county, and State of New York, did invent certain new and useful Improvements in Grain and Grass Harvesters; and I do hereby declare that the following is a full, clear, and exact description of the same, reference being had to the accompanying drawings, making a part of this specification, in which—

Figure 1:
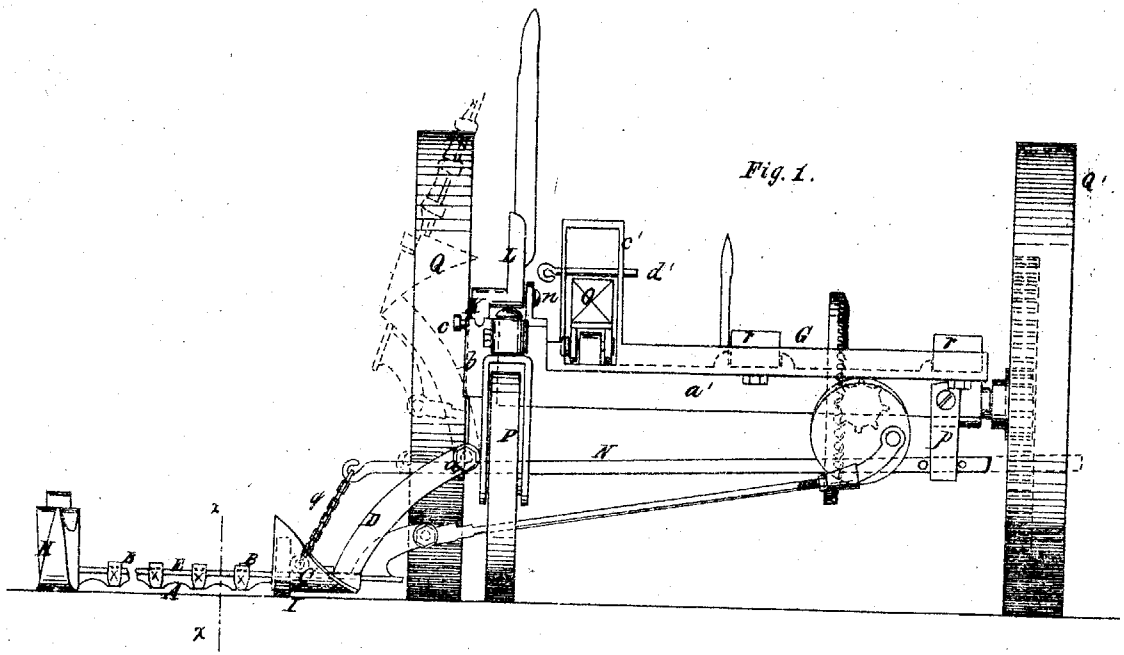
Figure 2:
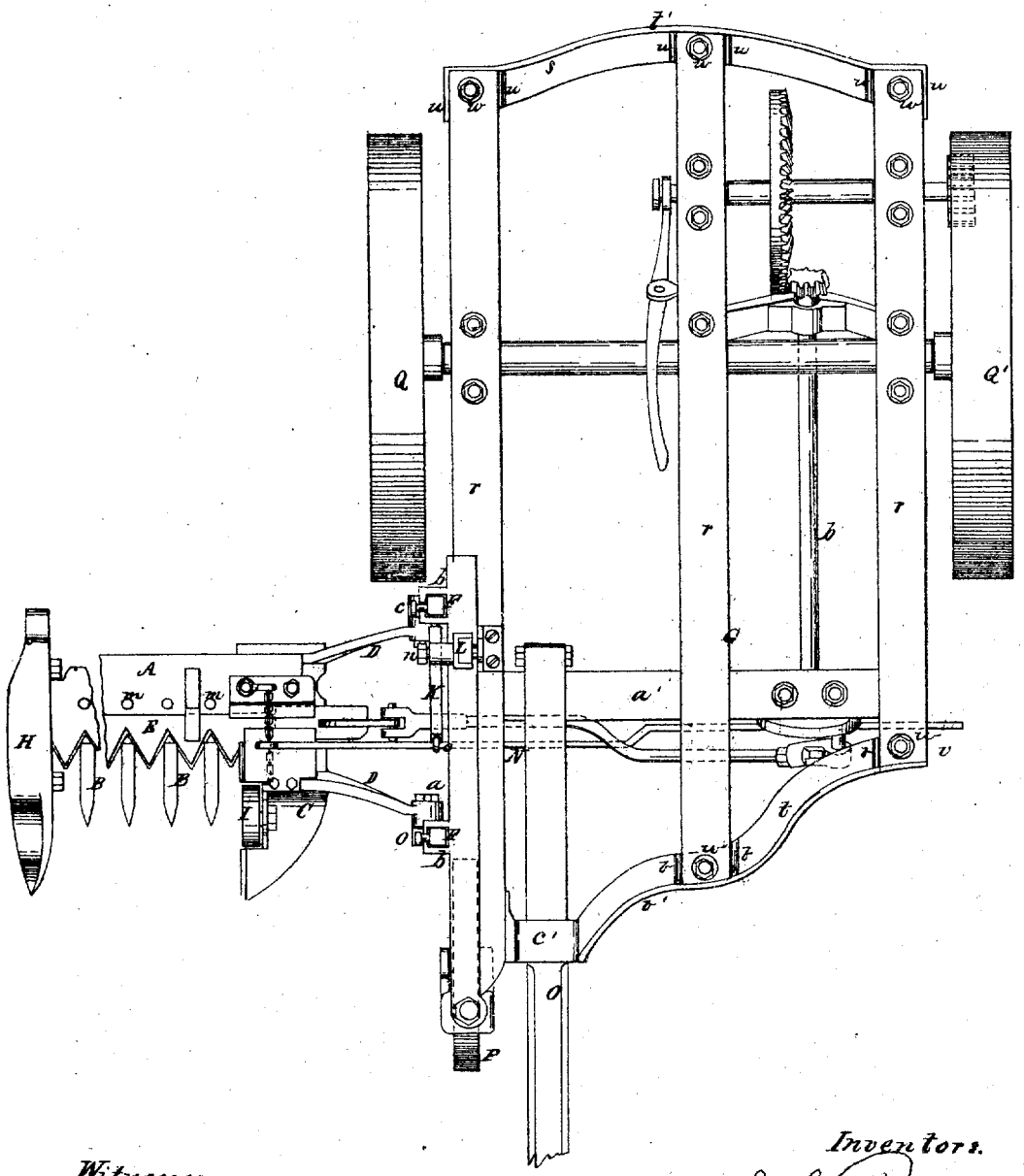
Figure 3:
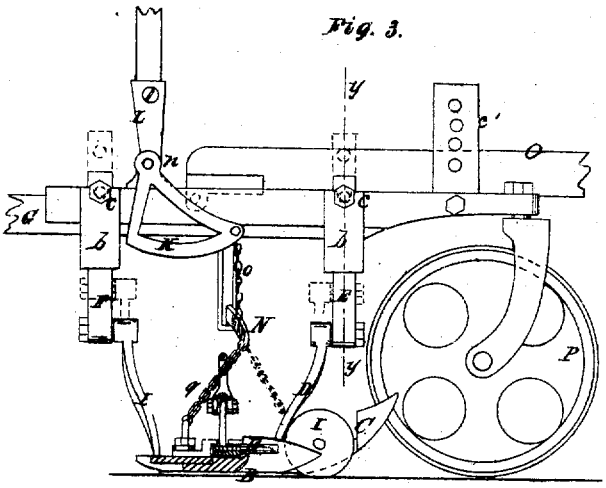
Figure 4:
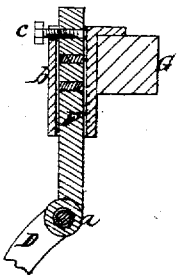
Figure 5:
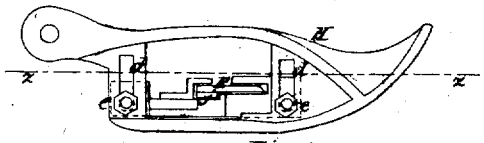
Figure 6:
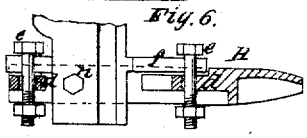
Figure 7:
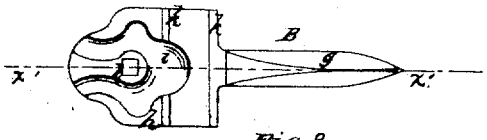
Figure 8:
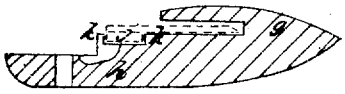

Figure 1 represents a front view of the machine. Fig. 2 represents a plan or top view of the same. Fig. 3 represents a vertical transverse section through the cutting apparatus, taken at the line *x x* of Fig. 1, and showing in elevation the coupling and raising apparatus. Fig. 4 represents a detached vertical section of a portion of the coupling apparatus, said section being taken at the line *y y* of Fig. 3. Fig. 5 represents a side view of the outside shoe or divider. Fig. 6 represents a horizontal section of the same, taken at the line *z z* of Fig. 5. Fig. 7 represents a top plan of one of the fingers or guards. Fig. 8 represents a longitudinal vertical section of the same, taken at the line *x′ x′* of Fig. 7.

Similar letters of reference, where they occur in the several figures, denote like parts of the machine in all cases.

This invention consists, first, in the improved manner of attaching the finger-bar and cutting apparatus to the main frame of the machine, whereby the finger-bar and sickle are allowed to conform to the irregularities in or on the surface of the ground over which they are passing, and at the same time rendered capable of being raised up to pass over any obstructions which may lie in their path, and, further, rendered capable of being turned upward entirely out of the way when the machine is being drawn from place to place; and the invention further consists in the manner of spreading and bracing the sliding and hinged connection between the finger-bar, cutting apparatus, and main frame, so that the finger-bar and its several connected parts may be rigidly braced to the main frame, while it is free to rise thereon or swing on its hinged joint, or both rise and swing, as will be explained; and the invention further consists in the interposition of a bar (that has a sliding motion in the direction of its length) between the lifting-lever and the inner shoe, so that when necessary the finger-bar may be raised up and leaned against the main frame, in addition to the slighter elevations necessary in passing obstacles of any kind in its path; and the invention further consists in using flanged or angle iron for the ends of the main frame, by which less framing and less timber in the longitudinal pieces are necessary, thus saving in expense of construction and weight of material; and the invention further consists in the construction of the fingers, whereby a ready egress is allowed for moisture and any foreign matter which might find its way beneath the sickle, the choking or clogging up of the latter being thereby prevented.

To enable others skilled in the art to make and use this invention, I will proceed to describe the same with reference to the drawings.

The wheels Q Q′ may run loose upon the main axle *d″*, and one of the wheels, Q′, has an internal gear upon it, which turns a pinion, *e′*, on the end of a shaft, *f′*, to which it is firmly affixed. On the shaft *f′* there is a bevel cog-wheel, *g′*, which works into a bevel-pinion, *h′*, on the end of the shaft *i′*, that extends forward to or near to the front of the main frame, and carries the crank-wheel *j′*, to which the pitman *k′*, that drives the cutters, is attached. A lever, *l′*, pivoted at *m′*, straddles a neck in the end of the shaft *f′*, so said shaft, with its pinion *e′*, may be moved endwise to throw said pinion out of or into gear with the main drive-wheel Q′.

The main frame is supported upon the main axle *d″*, and upon a caster-wheel, P, arranged at its front projecting end. This main frame is composed of longitudinal pieces of timber *r r r*, which are of unequal lengths, and are united at their ends by curved, flanged, or angle plates of iron *s t*. The advantages of such a frame are these: first, great economy in framing, as there are neither mortises nor tenons, said longitudinal pieces of timber being bolted, as at *w w*, to the metal plate, and further secured thereto by the flanges of the plates; secondly, lightness with great strength of the parts; and, thirdly, obviating the necessity of making the frame rectangular, and thus using greater lengths of timber and greater weight than there is any use for. It will be perceived that while the caster-wheel P, tongue O, and one of the braces that support the finger-bar have proper supports upon one corner of the front of the main frame, the other longitudinal pieces *r r* are much shorter, though more firmly braced and supported at their ends than they would be with a wooden cross-piece at that end, and the timber and its weight are both economized. An oblique wooden cross-piece would be difficult to frame to the ends of the longitudinal pieces if of unequal lengths, and would by no means be rigid enough to give stability to the frame.

A represents the finger-bar of the machine, and B the guards or fingers thereon. The finger-bar may be constructed in any of the usual ways, and is attached at its inner end to a shoe, C, which is curved upward in front, as usual. This shoe C has two arms or bars, D D, attached to it, which bars are slightly curved outward and upward, and are connected to the shoe C, one near its rear and the other at a point in front of the line of the sickle E, as shown more clearly in Fig. 2. The upper ends of the arms or bars D D are connected by joints *a a* to vertical parallel bars F F, which are fitted so as to freely though truly slide up and down in sockets, ways, or guides *b b*, attached to the main frame of the machine, the bars F being prevented from dropping or sliding below a given adjustable point by means of the pins *c c*, which may be set in any of the holes made in said bars for that purpose, while they are free to move upward until the hinges *a a* fetch up against the guides or slides. This method of attaching the finger-bar and cutting apparatus to the main frame admits of their rising and falling at either end independently of the other end, or at both ends, or bodily, as circumstances or the undulations in the surface of the ground may require. The finger-bar and sickle are allowed to conform perfectly to the irregularities of the surface of the ground, the joints or hinges *a a*, which connect the arms or bars D D to the bars F F, admitting of the rising or falling of the outer end of said finger-bar and sickle, while the sliding upward or downward of the bars F F in their guides or ways admits of the inner end of the same rising or falling, but in a vertical direction mainly, though partially in a curved line, like the outer end, through the action of the interposed joints or hinges *a a*.

The arms D D, rigidly attached to the shoe C, have a wide bearing on said shoe, and, being curved upward and outward for a further bracing from the shoe toward the frame, and thus spread where they join the vertical bars F F, form a very firm support for sustaining and advancing the cutter and finger bars at right angles to the main frame. They also leave an open space to admit of the use of the lever N and the other lifting devices, by means of which the driver or conductor is enabled to raise the cutter-bar to such desired height as will pass it over intervening obstacles, and also afford sufficient space for the free working of the pitman-rod. This method of constructing and uniting the arms D D and bars F F by hinges *a a*, together with the use of the small bolts *c c*, admits of the elevation of the cutter-bar to the side and partly over the main frame, so that when in that position the entire finger and cutter bar is raised to a considerable height above the surface of the ground, enabling it to freely pass all obstacles, and by the use of the bars F F, in connection with the small bolts *c c* and the series of bolt-holes, the inner ends of the cutter and finger bars may be adjusted to any required height.

By making the bars F F square and working them in square boxes or guides broad bearing surfaces are created with but little friction or cramping, and secure a free and certain automatic vertical motion of the finger and cutter bar in passing over uneven ground. In connection with the interposed lever N, between the segment K and shoe C, the sliding bars F F admit of the lifting of the inner end of the finger and cutter bars until the joints *a a* strike the lower end of the sockets or guides *b b*, and when in that position the joints *a a* become a fulcrum in connection with the curved arms D D, so that by continuing the pressure or force upon the lever N the whole cutter-bar may be bodily raised to any desirable height, and then leaned against the main frame, as shown by the dotted lines in Fig. 1. The lever N has a sliding motion in the direction of its length, and when the finger and cutter bars and their several attached parts are thus raised up and leaned against the main frame for the purposes of easy transportation the lever N must slide from the shoe C until it assumes a position as shown in the dotted lines in said Fig. 1. If the lever had not this end motion, it would be in the way of the shoe or finger-bar and prevent them from coming up close to the main frame when raised and leaned up toward it. The shoe C must be far enough removed from the main frame to bring the sickle fairly into the standing grain without running the supporting-wheel on that side so near as to break down or overrun the grain, and that the lever N may have its best lifting position it should extend outward until it is immediately over the shoe, to which it is connected by the chains *q*, and above the lever is further connected to the lifting-segment K by the chain *o*. The segment K is pivoted at *n* to the main frame, and has socket L in it, into which a lever is fitted for the attendant to grasp when the finger-bar is to be raised up, held up, or let down.

The finger-bar A is attached at its outer end to a shoe, H, which may be of the usual form. This shoe has two vertical and parallel slots, *d d*, made in it, as shown clearly in Fig. 5, and through these slots screw-bolts *e e* pass into a plate, *f*, which is attached to the finger-bar, as seen in Figs. 5 and 6. By this method of attaching the finger-bar to the shoe H it will be seen that the outer end of the finger-bar may be adjusted at a higher or lower elevation from the ground, as the screw-bolts *e e* may be secured in the slots at any desired point. The inner end of the finger-bar may be adjusted at a corresponding high or low point with its outer end by placing the pins *c c* higher or lower in the sliding bars F F.

The shoe C, at the inner end of the finger-bar A, is provided with a wheel, I, which is placed directly in front of the finger-bar, and at the outer side of the shoe, as shown in Fig. 2. This wheel I is quite small in diameter, and is designed to aid the passage of the shoe over any cut grass or grain that may lie in its path; and it also serves as a firm bearing in front of the finger-bar to prevent it from being depressed or forced down under the cutting action of the sickle—a difficulty attending the operation of many harvesters. This downward tendency of the front part of the finger-bar is still further prevented by the front bar, D, which is, from its position, a brace against any such tendency.

The fingers B of the bar A are of the usual form at their front parts, *g*. Their rear portions, *h*, are also of the usual form externally; but in the upper surfaces of the back parts, *h*, there are grooves or channels *i*, as shown in Fig. 7. These grooves or channels are of the form shown in said Fig. 7, and extend forward under the sickle-bar *j*, which works between the parallel ledges *k k* on the fingers. The grooves or channels also extend each side of holes or openings *l*, made in the fingers, through which and the finger-bar bolts *m* pass to secure the fingers to the finger-bar, and extend to the back ends of the fingers and admit of the ready egress or escape of moisture, gum, and other foreign substances which may work underneath the sickle-bar *j*, and thus effectually prevent the choking or clogging up of the sickle E.

The draft-pole O is attached to the cross-bar *a'*, and it passes through a metal loop, *c'*, which is perforated at its sides, and has a pin, *d'*, passing through it to serve as a bearing for the draft-pole, and for the front part of the main frame should the caster-wheel P by any accident give way.

Having thus fully described the nature of the invention and the operation of the machine, what is claimed herein as new is—

1. The combination of the upwardly-curved arms D and sliding bars F, when united by a hinged joint, *a*, substantially as and for the purpose described.

2. The combination of the outwardly-curved arms with the wide-spread bearings or boxes *b*, for the purpose of bracing the shoe and finger-bar to the main frame in the direction of their greatest strain, substantially as described.

3. The combination of the sliding lever N with the lifting-segment K and shoe C and their flexible connections *o q*, for the purpose of raising up, holding up, or lowering the finger-bar and cutting apparatus, substantially as and for the purpose described.

4. The curved, flanged, or angle-iron bars or plates *s t*, for uniting the longitudinal pieces *r r*, as herein represented, and for the purposes described.

5. The guard-fingers having backs *h* and ledges *k*, extending continuously along the bar, so as to present closed surfaces in front and beneath, and formed with channels or grooves *i*, extending beneath the sickle-bar and partially around the bolt-holes *l*, and open at the back to permit the ready escape of moisture, gum, or other foreign matter, and thus avoid choking or clogging, substantially as described.

JOHN S. MITCHELL.

Witnesses:
WM. H. KIPP,
HENRY O. BUSH.